(12) United States Patent
Komatsu et al.

(10) Patent No.: US 6,844,371 B1
(45) Date of Patent: Jan. 18, 2005

(54) MATERIAL HAVING SEPARATING FUNCTION

(75) Inventors: Makoto Komatsu, Kanagawa (JP); Kazuyoshi Takeda, Kanagawa (JP); Kunio Fujiwara, Kanagawa (JP); Takeshi Takai, Kanagawa (JP)

(73) Assignee: Ebara Corporation, Tokyo (JP)

( * ) Notice: Subject to any disclaimer, the term of this patent is extended or adjusted under 35 U.S.C. 154(b) by 202 days.

(21) Appl. No.: 10/111,080

(22) PCT Filed: Oct. 20, 2000

(86) PCT No.: PCT/JP00/07322

§ 371 (c)(1),
(2), (4) Date: Apr. 19, 2002

(87) PCT Pub. No.: WO01/29105

PCT Pub. Date: Apr. 26, 2001

(30) Foreign Application Priority Data

| Oct. 21, 1999 | (JP) | 11-299462 |
| Mar. 6, 2000 | (JP) | 2000-060509 |

(51) Int. Cl.$^7$ .................. C08F 291/00; C08J 7/18; D06M 4/10
(52) U.S. Cl. ............ 521/31; 521/32; 521/33; 522/124; 525/69; 525/76; 526/293; 526/346
(58) Field of Search .................. 521/31, 32, 33; 522/124, 114; 526/293, 346; 525/69, 76

(56) References Cited

U.S. PATENT DOCUMENTS

| 3,278,255 A | 10/1966 | Chen et al. |
| 5,071,880 A | 12/1991 | Sugo et al. |
| 5,162,445 A * | 11/1992 | Powers et al. ............ 525/333.4 |
| 5,164,424 A * | 11/1992 | Brueschke et al. ......... 522/116 |
| 5,425,866 A | 6/1995 | Sugo et al. |
| 5,743,940 A | 4/1998 | Sugo et al. |
| 6,359,019 B1 * | 3/2002 | Stone et al. .................. 521/27 |

FOREIGN PATENT DOCUMENTS

| JP | 50-105581 | 8/1975 |
| JP | 53-008691 | 1/1978 |
| JP | 63-135432 | 6/1988 |
| JP | 1-258740 | 10/1989 |
| JP | 2-187136 | 7/1990 |
| JP | 2-187143 | 7/1990 |
| JP | 2-187144 | 7/1990 |
| JP | 5-57281 | 3/1993 |
| JP | 5-64726 | 3/1993 |

OTHER PUBLICATIONS

Database WPI, Section Ch, Week 199512, Derwent Publications Ltd., London, GB; Class A–14, AN 1995–085443 & JP 07 010925 A (Yazaki Corp) (1995); abstract.

Patent Abstracts of Japan; vol. 1996, No. 10 (1993); & JP 8 157504 (Asahi Chem Ind Co Ltd) (1996); abstract.

Database WPI, Section Ch, Week 199247, Derwent Publications Ltd., London, GB; Class D15, AN 1992–386091 & JP 04 284853 A (Ebara Corp) (1992); abstract.

Sahni et al., Coordination Chemistry Review, vol. 59, pp. 16–22, 1984.

* cited by examiner

*Primary Examiner*—Susan Berman
(74) *Attorney, Agent, or Firm*—Wenderoth, Lind & Ponack, L.L.P.

(57) ABSTRACT

An object of the present invention is to provide a separation functional material having more excellent adsorptive separation performance than previously. In order to attain this object, separation functional materials of the present invention are characterized in that they are formed by introducing a polymer side chain derived from a p-haloalkylstyrene onto the backbone of an organic polymer base and introducing a functional group onto the polymer side chain.

8 Claims, No Drawings

MATERIAL HAVING SEPARATING FUNCTION

FIELD OF THE INVENTION

The present invention relates to separation functional materials that can be used to remove trace ions contained in water or organic media by adsorption or to remove trace gases in the air by adsorption and preparation processes thereof as well as organic polymer materials that can be used to prepare said separation functional materials.

PRIOR ART

Ion exchange resins or chelate resins have been used to remove trace ions such as metal ions in industrial water or wastewater. All these resins are limited to applications for use in packed column systems because they are in the form of beads having a diameter of about 0.5 mm. In this case, removal performance depends on the amount of packed resins or the water flow rate, and improves as the flow rate decreases. However, an increase of the amount of packed resins is not economical.

Removal performance of bead-like ion exchange resins or chelate resins is insufficient even if the flow rate is decreased to extend the period during which the resins are in contact with the medium to be treated. This is because ion exchange resins or chelate resins normally have a rigid three-dimensional structure due to the presence of crosslinkers such as divinylbenzene, so that ions or other trace substances diffuse into resin particles at low speed. In addition, they were difficult to incinerate when they were not recycled but desired to be disposable.

As alternative materials to ion exchange resins or chelate resins, fibrous ion exchangers or chelate exchangers were proposed and commercialized. They have the advantage of a large specific surface area and therefore a higher adsorption speed than that of bead-like resins though ions cannot diffuse into fibers at high speed because they have a crosslinked structure. However, they also have the disadvantage of a lower adsorption capacity than that of bead-like resins because of large gaps in the materials. Thus, they could not be used in applications for which high removal performance is required.

Chemical filters capable of removing very trace gaseous components in the air are highly evaluated in precision industries such as semiconductor industry. Filters used here are required to have low pressure loss and high removal efficiency because they undergo higher flow rates and shorter contact periods than in the case of water treatment. Therefore, nonwoven fabric filters comprising a fibrous ion exchanger are suitable, but ion exchangers having a crosslinked structure have the disadvantages of insufficient removal efficiency and much gas emission from filters themselves.

As a new material to solve these problems, a separation functional material was proposed wherein an ion exchange group has been introduced into an organic polymer base such as a woven or nonwoven fabric by radiation-induced graft polymerization. For example, JP-B-20554/1994 proposes a gas adsorbent obtained by graft-polymerizing styrene or a haloalkylstyrene such as chloromethylstyrene to a woven/nonwoven base by radiation-induced graft polymerization and then introducing an ion exchange group onto the resulting graft polymer side chain. This method allows an ion exchange group to be introduced without affecting characteristics of the woven or nonwoven base and ensures high ion diffusion speed in the material and high removal efficiency because of the absence of a crosslinked structure. Thus, radiation-induced graft polymerization is well suitable as a means for preparing an adsorptive separation material.

However, advanced development of precision industries demands further reduction of residues in working spaces or washing liquids. Regulations on emission levels of hazardous substances into the natural environment have also become stricter. Thus, there are high demands for improvement of the adsorptive separation technology, especially for an appearance of a high performance adsorptive separation material from not only the industrial world but also general world.

DISCLOSURE OF THE INVENTION

As a result of careful studies to solve the above problems, we accomplished the present invention on the basis of the finding that very excellent adsorption performance can be obtained by using p-haloalkylstyrenes among other haloalkylstyrenes to form a graft polymer side chain to be introduced into an organic polymer base rather than using styrene derivatives having a haloalkyl group at the ortho or meta position or other graft monomers.

THE MOST PREFERRED EMBODIMENTS OF THE INVENTION

Accordingly, an aspect of the present invention relates to an organic polymer material characterized by having a polymer side chain derived from a p-haloalkylstyrene on the backbone of an organic polymer base. A separation functional material with excellent performance can be obtained by introducing an ion exchange group, chelate group, hydrophilic group or the like onto the polymer side chain of the organic polymer material. Thus, another aspect of the present invention relates to a separation functional material characterized in that a functional group has been introduced onto the polymer side chain of the organic polymer material.

Without being bound to any theory, the reason why very excellent adsorption performance can be obtained by using a p-haloalkylstyrene to form a polymer side chain rather than using a styrene derivative having a haloalkyl group at the ortho or meta position may be explained as follows.

When a graft polymer side chain is formed on an organic polymer base, one end of the graft polymer chain is immobilized onto the organic polymer base via covalent bond. The other end of the polymer chain may sometimes join to another graft chain, but usually does not seem to join to another polymer chain. Therefore, the other end of the polymer chain (the end not immobilized to the organic polymer base) has a high mobility. When the graft monomer is a styrene derivative having a haloalkyl group at the para position, polymerization proceeds with a sterically reasonable structure so that the haloalkyl group is oriented to less sterically hinder adjacent graft chains. Thus, an ion exchange group, chelate group, hydrophilic group or the like seems to be introduced at high efficiency during the subsequent step of introducing a functional group as compared with ortho or meta derivatives. The above steric structure of the graft chain is also effective to more sufficiently swell the graft chain with a plurality of water molecules coordinated around the functional group such as an ion exchange group, chelate group or hydrophilic group. Especially for the performance of separating ions in water or gaseous components in the air by adsorption, it is advantageous that functional groups are less sterically hindered and that the graft chain is sufficiently swollen.

Moreover, p-haloalkylphenyl group is not only highly reactive enough to readily introduce a functional group such as an ion exchange group, chelate group or hydrophilic group, but also highly chemically resistant because of the stable benzene ring.

Among p-haloalkylstyrenes, p-chloromethylstyrene is the most preferred monomer for use in separation functional materials of the present invention because it is the most inexpensive and readily available.

In organic polymer materials of the present invention, suitable means for introducing a side chain in the form of a polymer chain derived from a p-haloalkylstyrene onto the polymer backbone include graft polymerization. Especially, radiation-induced graft polymerization is most preferred for the purpose of the present invention, because a desired graft polymer side chain can be introduced into an organic polymer base by irradiating the base to produce a radical and reacting it with a graft monomer and the number or length of the graft chain can be relatively freely controlled and the polymer side chain can be introduced into existing polymer materials in various shapes.

Radiations that can be used in radiation-induced graft polymerization well suitable for the purpose of the present invention include α-rays, β-rays, γ-rays, electron rays, UV ray, etc., among which γ-rays and electron rays are preferred for use in the present invention. Radiation-induced graft polymerization includes preirradiation graft polymerization involving preliminarily irradiating a graft base and then bringing it into contact with a polymerizable monomer (graft monomer) for reaction, and simultaneous irradiation graft polymerization involving simultaneously irradiating a base and a monomer, and either method can be used in the present invention. Radiation-induced graft polymerization includes various manners of contact between a monomer and a base, such as liquid phase graft polymerization performed with a base immersed in a monomer solution, gas phase graft polymerization performed with a base in contact with the vapor of a monomer, or immersion gas phase graft polymerization performed by immersing a base in a monomer solution and then removing it from the monomer solution for reaction in a gas phase, and any method can be used in the present invention.

Fibers and woven/nonwoven fabrics comprising a fiber assembly are the most preferred materials for use as organic polymer bases for preparing organic polymer materials of the present invention, and are well suitable for use in the immersion gas phase graft polymerization because they tend to retain monomer solutions.

Organic polymer bases for preparing organic polymer materials of the present invention are preferably polyolefin-based organic polymer bases. Polyolefin-based organic polymer bases are suitable for the purpose of introducing a graft side chain by radiation-induced graft polymerization because they are not degradable by radiations. Specific examples of polyolefin-based polymer materials well suitable for use as organic polymer bases for preparing organic polymer materials of the present invention include, but not limited to, polyolefins such as polyethylene and polypropylene; halogenated polyolefins such as PTFE and polyvinyl chloride; and olefin-halogenated olefin copolymers such as ethylene—ethylene tetrafluoride copolymers and ethylene-vinyl alcohol copolymers (EVA).

These organic polymer bases can be preferably in the form of a polymer elemental fiber or a woven or nonwoven fabric comprising an assembly thereof. Fibrous polymers have a large surface area enough to remove heavy metal ions at high speed and they are light and readily formable. Fibers and woven/nonwoven fabrics comprising a fiber assembly or processed products thereof having a large specific surface area are insufficient in adsorption capacity, but they are useful to enhance the effect of the functional group introduced into the haloalkyl group at the para position and it should be noted that removal efficiency is rather important for adsorptive removal of very trace elements in water or in the air. Specific examples of such forms include long fibers and processed products thereof, short fibers and processed products thereof as well as segments thereof. Long fibers include, for example, continuous filaments, and short fibers include, for example, staple fibers. Processed products of long and short fibers include various woven and nonwoven fabrics made from these fibers. Some woven/nonwoven fabric bases have a filter function or the like by themselves so that a multifunctional material can be formed by introducing a functional group such as an ion exchange group or a chelate group into a base having such a function because it can remove not only ions but also fine particles or the like. Woven/nonwoven materials can be suitably used as bases for radiation-induced graft polymerization and are preferred for separation functional materials of the present invention used in the form of a filter because they are light and easy to form into a filter. Separation functional materials prepared from woven/nonwoven fabrics can be easily handled during disposal and readily incinerated in contrast to conventional resins having a crosslinked structure that are not easy to incinerate.

Separation functional materials having desired adsorptive separation performance can be formed by using an organic polymer material having a polymer side chain derived from a p-haloalkylstyrene on the backbone of an organic polymer base of the present invention and introducing one of various functional groups such as ion exchange groups, chelate groups and hydrophilic groups onto the polymer side chain.

Ion exchange groups that can be introduced for this purpose include sulfonate, phosphate, carboxyl, quaternary ammonium and tertiary amino groups, for example. Suitable chelate groups include functional groups derived from iminodiacetic acid and sodium salts thereof; functional groups derived from various amino acids such as phenylalanine, lysine, leucine, valine and proline as well as sodium salts thereof; functional groups derived from iminodiethanol, etc. Suitable hydrophilic groups include cation exchange groups such as sulfonate, phosphate and carboxyl groups; anion exchange groups such as quaternary ammonium, tertiary amino, secondary amino and primary amino groups; and non-ion exchange groups such as amide and hydroxyl groups. Other functional groups having redox ability such as hydrazide, aldehyde and peroxide groups can also be introduced.

Separation functional materials of the present invention can be prepared by first introducing a polymer side chain by graft-polymerizing a p-haloalkylstyrene onto the polymer backbone of an organic polymer base to form an organic polymer material of the present invention. Then, the halogen group on the polymer side chain can be replaced with a compound having a functional group such as an ion exchange group, chelate group or hydrophilic group to introduce these functional groups onto the polymer side chain, whereby a separation functional group of the present invention can be prepared.

Especially when it is desirable to introduce a chelate group, organic polymer materials of the present invention can alternatively be prepared by replacing the halogen group on the polymer side chain with a compound having a functional group capable of being converted into the chelate group and then converting the functional group into the chelate group. Compounds having a functional group capable of being converted into a chelate group that can be used for this purpose include, for example, dialkyl aminodiacetate esters and alkyl esters of various amino acids. Specifically, a p-haloalkylstyrene is first graft-polymerized onto the polymer backbone of an organic polymer base and the halo group on the resulting polymer side chain is reacted with a sulfide to form a sulfonium salt, which is then reacted with sodium iminodiacetate, whereby an organic polymer material of the present invention in which a sodium iminodiacetate group has been introduced onto the polymer side chain can be obtained. Alternatively, a p-haloalkylstyrene is first graft-polymerized onto the polymer backbone of an organic polymer base and the halo group on the resulting polymer side chain is replaced with iodine and then reacted with diethyl iminodiacetate ester to replace iodine with a diethyl iminodiacetate ester group, which is then converted into a sodium salt by reaction with sodium hydroxide, whereby an organic polymer material of the present invention in which a sodium iminodiacetate group has been introduced onto the polymer side chain can be obtained.

Separation functional materials of the present invention can have desired separation performance by appropriately selecting the nature of the functional group to be introduced onto the polymer side chain. Separation functional materials having excellent adsorptive separation performance as a gas adsorbent, for example, can be provided by introducing an ion exchange group such as sulfonate or quaternary ammonium group as a functional group. Separation functional materials in which a chelate group derived from iminodiacetate group or iminodiethanol has been introduced as a functional group show excellent performance as heavy metal ion scavengers in organic media or water so that they can be suitably used to remove heavy metal ions such as cobalt, nickel, copper, mercury, cadmium, lead, iron, zinc or the like. When a hydrophilic group such as quaternary ammonium or amide group is introduced as a functional group, separation functional materials showing excellent properties as materials for desorbing water in the air can be provided, for example.

The following examples further illustrate the present invention. The following examples show specific preferred embodiments of the present invention without, however, limiting the invention thereto.

EXAMPLE 1

A nonwoven cloth having an areal density of 50 g/m$^2$ and a thickness of 0.3 mm made of a polyethylene fiber of 12 μm in diameter was irradiated with γ-rays at 150 kGy in a nitrogen atmosphere. Then, the nonwoven cloth was immersed in a p-chloromethylstyrene (CMS-14 from Seimi Chemical) solution and reacted at 50° C. for 5 hours. The p-chloromethylstyrene had been freed of stabilizers by contact with activated alumina before use. After reaction, the nonwoven cloth was immersed in an acetone solution to remove unreacted monomer and homopolymer (homopolymer of p-chloromethylstyrene). After drying, the weight was measured to calculate the grafting degree (weight gain) at 116%.

This graft product was immersed in a 10% aqueous trimethylamine solution and reacted at 40° C. for 2 hours for conversion into a quaternary ammonium compound to give a strongly basic anion exchange nonwoven cloth. This nonwoven cloth had a neutral salt decomposition capacity of 2.76 meq/g, which was as high as 95% of the theoretical neutral salt decomposition capacity calculated from the grafting degree.

COMPARATIVE EXAMPLE 1

Graft polymerization was performed in the same manner as in Example 1 except that meta/para mixed chloromethylstyrene (50% m-isomer, 50% p-isomer, trade name: CMS-AM from Seimi Chemical) was used in place of p-chloromethylstyrene as a monomer for graft polymerization at a grafting degree of 104%. This graft product was reacted for conversion into a quaternary ammonium compound in the same manner as in Example 1 to give a strongly basic anion exchange nonwoven cloth. This nonwoven cloth had a neutral salt decomposition capacity of 2.43 meq/g, which was 87% of the theoretical neutral salt decomposition capacity calculated from the grafting degree and lower than that of Example 1.

Example 1 and Comparative example 1 show that a functional group can be more readily and efficiently introduced during the subsequent step into the graft product obtained by graft-polymerizing p-chloromethylstyrene than a meta/para mixture.

EXAMPLE 2

In this example, silica removal tests were made using an anion exchange nonwoven cloth prepared with p-chloromethylstyrene in combination with a cation exchange nonwoven cloth prepared with glycidyl methacrylate in order to assess pure ion exchangeability of the anion exchange nonwoven cloth.

A nonwoven cloth as used in Example 1 was irradiated in the same manner as in Example 1 and then immersed in a glycidyl methacrylate solution and reacted at 45° C. for 4 hours. Then, the nonwoven cloth was immersed in dimethylformamide at 50° C. for 3 hours to remove unreacted monomer and homopolymer. After washing with acetone, the graft degree was calculated from the dry weight at 132%. This graft product was immersed in an aqueous solution of 12% sodium sulfite, 10% isopropyl alcohol and 78% water and sulfonated at 80° C. for 7 hours. The nonwoven cloth was removed and washed with pure water and then regenerated with hydrochloric acid. A strongly acid cation exchange nonwoven cloth having a neutral salt decomposition capacity of 2.83 meq/g was obtained.

Round sections of 24 mm in diameter were stamped out from this strongly acid cation exchange nonwoven cloth and the strongly basic anion exchange nonwoven cloth prepared in Example 1. Twenty round samples of the strongly acid cation exchange nonwoven cloth were regenerated by immersion in 1 L of a 7% aqueous hydrochloric acid solution and then packed in a column of 25 mm in diameter. On the other hand, ten round samples of the strongly basic anion exchange nonwoven cloth were regenerated by immersion in 500 ml of an 8% aqueous sodium hydroxide solution for 1 hour and then packed in a column of 25 mm in diameter. The bed height was 19 mm for the strongly acid cation exchange nonwoven cloth and 11 mm for the strongly basic anion exchange nonwoven cloth.

The two columns were connected in series in such a manner that the strongly acid cation exchange nonwoven cloth was followed by the strongly basic anion exchange nonwoven cloth and synthetic raw water prepared at 10 mg/l brine as $CaCO_3$ and 1.2 mg/l silica was passed at a flow rate of 500 mL/h. The silica content in treated water was stable at a low level of 0.11 μg/l.

COMPARATIVE EXAMPLE 2

Water feed tests were performed with synthetic raw water under the same conditions as in Example 2 except that 11 samples of the strongly basic anion exchange nonwoven cloth used in Comparative example 1 were packed at almost the same total exchange capacity for the combined colums in place of the strongly basic anion exchange nonwoven cloth of the present invention used in Example 2 to show that the silica content in treated water was 1.8 µg/l, which was very higher than in Example 2.

Example 2 and Comparative example 2 show that ion exchangeability of strongly basic anion exchange nonwoven cloths in water is remarkably better when they are prepared by graft-polymerizing para-chloromethylstyrene than meta/para chloromethylstyrene.

EXAMPLE 3

The p-chloromethylstyrene-grafted nonwoven cloth (4.0 g) obtained in Example 1 was immersed in a solution of 40 ml of diethyl iminodiacetate and 2.0 g of sodium iodide in dimethylformamide (200 ml) and heated at 80° C. for 24 hours and then washed with methanol and the solvent was wiped off. The nonwoven cloth was further heated at 70° C. for 3 hours in a mixed solvent of ethanol and 1N sodium hydroxide (100 ml+100 ml). The nonwoven cloth was thoroughly washed with pure water and dried under reduced pressure. The iminodiacetate group level calculated from weight gain was 2.08 mmol/g.

Twenty round samples of 24 mm in diameter stamped out from this nonwoven cloth were packed in a column having an inner diameter of 24 mm. The total iminodiacetate group level in the column is calculated at 1.66 mol. Synthetic raw water was prepared by dissolving copper sulfate in water at a copper ion concentration of 10 mg/l. Ten liters of this raw water was passed through the above column at a flow rate of 500 ml/h to show a copper level of 8 µg/l in treated water (removal efficiency 99.9% or more).

COMPARATIVE EXAMPLE 3

Iminodiacetate group was introduced into 4.0 g of the chloromethylstyrene-grafted nonwoven cloth of Comparative example 1 in the same manner as in Example 3. The iminodiacetate group level calculated from weight gain was 1.96 mmol/g.

Twenty-two round samples were stamped out from this nonwoven cloth in the same manner as in Example 3 and packed in a similar column. The total iminodiacetate level in the column is calculated at 1.72 mmol. This column was used in water feed tests with synthetic raw water containing copper ion in the same manner as in Example 3 to show a copper level of 125 µg/l in treated water.

Example 3 and Comparative example 3 show that the graft-polymerized nonwoven cloth prepared with para-chloromethylstyrene has remarkably better metal ion exchangeability in water than the graft-polymerized nonwoven cloth prepared with meta/para chloromethylstyrene.

INDUSTRIAL APPLICABILITY

According to the present invention, very high-performance separation functional materials for removing trace ions contained in water or organic media by adsorption or removing trace gases in the air by adsorption or removing water in the air can be prepared. Separation functional materials of the present invention can be used to create a very clean environment or greatly reduce emission of hazardous substances into the natural environment.

What is claimed is:

1. An organic polymer material having graft chains on the backbone of a polyolefin base, wherein substantially all of the graft chains are obtained by graft polymerizing p-haloalkylstyrene to the polyolefin base.

2. The organic polymer material of claim 1, wherein said polyolefin base is selected from fibers, woven or nonwoven fabrics, or processed products thereof.

3. The organic polymer material of claim 1, wherein said graft chains are obtained by radiation-induced graft polymerizing the p-haloalkylstyrene to the polyolefin base.

4. The organic polymer material of claim 1, wherein said p-haloalkylstyrene is p-chloromethylstyrene.

5. A separation functional material wherein a functional group selected from ion exchange groups, chelate groups and hydrophilic groups has been introduced onto the graft chains of the organic polymer material of claim 1.

6. A process for preparing the separation functional material of claim 5, comprising graft-polymerizing a p-haloalkylstyrene to a polyolefin base to form a polymer side chain and then introducing a functional group onto said polymer side chain by reacting it with a compound having said functional group or reacting it with a compound having a group capable of being converted into said functional group and then converting said group into said functional group.

7. The process according to claim 6, wherein the graft-polymerization is conducted by a radiation-induced graft polymerizing the p-haloalkylstyrene to the polyolefin base.

8. A separation functional material prepared by the process of claim 6.

* * * * *